(12) United States Patent
Verwaest

(10) Patent No.: US 9,335,976 B1
(45) Date of Patent: May 10, 2016

(54) TRACKING PROPERTY REPRESENTATIONS IN MODIFIED COMPUTATIONAL OBJECTS

(71) Applicant: Google Inc., Mountain View, CA (US)

(72) Inventor: Toon Wim Jan Verwaest, Munich (DE)

(73) Assignee: Google Inc., Mountain View, CA (US)

( * ) Notice: Subject to any disclaimer, the term of this patent is extended or adjusted under 35 U.S.C. 154(b) by 10 days.

(21) Appl. No.: 14/023,433

(22) Filed: Sep. 10, 2013

(51) Int. Cl.
*G06F 9/44* (2006.01)
*G06F 17/30* (2006.01)
*G06F 11/36* (2006.01)

(52) U.S. Cl.
CPC ............ *G06F 8/315* (2013.01); *G06F 11/3688* (2013.01); *G06F 17/30* (2013.01)

(58) Field of Classification Search
CPC ...... G06F 8/315; G06F 17/30; G06F 11/3688
See application file for complete search history.

(56) References Cited

U.S. PATENT DOCUMENTS

| | | | |
|---|---|---|---|
| 6,550,057 B1 * | 4/2003 | Bowman-Amuah | G06F 17/30 700/80 |
| 6,868,425 B1 * | 3/2005 | Bergstraesser | G06F 17/30607 |
| 8,244,775 B1 * | 8/2012 | Bak et al. | 707/802 |
| 8,392,881 B1 * | 3/2013 | Lund et al. | G06F 8/315 717/116 |
| 2002/0059293 A1 * | 5/2002 | Hirsch | G06F 17/30607 |
| 2003/0009458 A1 * | 1/2003 | Nakano et al. | G06F 17/30 |
| 2003/0236775 A1 * | 12/2003 | Patterson | G06F 9/4443 |
| 2007/0255751 A1 * | 11/2007 | Bansal et al. | G06F 8/10 |
| 2008/0164908 A1 * | 7/2008 | Challenger et al. | G06F 9/4436 326/46 |
| 2008/0222454 A1 * | 9/2008 | Kelso | G06F 11/3688 714/38.14 |
| 2009/0228507 A1 * | 9/2009 | Jain et al. | 707/102 |
| 2010/0042929 A1 * | 2/2010 | Berry et al. | 715/738 |
| 2012/0173998 A1 * | 7/2012 | Chaturvedi et al. | 715/762 |
| 2013/0263085 A1 * | 10/2013 | Bouchereau | 717/108 |
| 2015/0234735 A1 * | 8/2015 | Chaturvedi et al. | G06F 11/3688 717/125 |

OTHER PUBLICATIONS

Kamin Whitehouse et al., "Semantic Streams: A Framework for Composable Semantic Interpretation of Sensor Data". [Online], 2006, pp. 5-20, [Retrieved from Internet on Dec. 26, 2015], <http://download.springer.com/static/pdf/89/chp%253A10.1007%252F11669463_4.pdf>.*

(Continued)

*Primary Examiner* — Thuy Dao
*Assistant Examiner* — Ziaul A Chowdhury
(74) *Attorney, Agent, or Firm* — McDermott Will & Emery LLP

(57) ABSTRACT

A system and method is disclosed for tracking representations of object properties in modified computational objects. A computational object of the subject technology may include an object property having a first value of a first property type. When the object property is set to a second value of a second property type, a new object map is generated for the computational object, the new object map mapping the object property to the second property type, and transition information in a base object map is updated to designate the new object map instead of a first object map. The first object map is then marked as invalid.

17 Claims, 5 Drawing Sheets

(56) References Cited

OTHER PUBLICATIONS

Boris Katz et al., "Omnibase: Uniform Access to Heterogeneous Data for Question Answering", [Online], 2002, pp. 230-234, [Retrieved from Internet on Dec. 26, 2015], <http://download.springer.com/static/pdf/896/chp%253A10.1007%252F3-540-36271-1_23.pdf>.*

Syed Hamid Tirmizi et al., "Translating SQL Applications to the Semantic Web", [Online], 2008, pp. 450-464, [Retrieved from Internet on Dec. 26, 2015], <http://www.cs.utexas.edu/~jsequeda/rdb2rdf/sql2sw_dexa2008.pdf>.*

Peter Lyngbaek et al., "Object Management in Distributed Information Systems", [Online], ACM 1984, pp. 96-122, [Retrieved from Internet on Dec. 26, 2015], <http://delivery.acm.org/10.1145/360000/357415/p96-lyngbaek.pdf>.*

\* cited by examiner

TRACKING PROPERTY REPRESENTATIONS IN MODIFIED COMPUTATIONAL OBJECTS

BACKGROUND

Some dynamically-typed languages (e.g., JavaScript) provide computational objects in the form of associative arrays. An associative array is an abstract data structure arranges as a collection of key-value pairs, such that each possible key appears at most once in the collection. Accordingly, property values may be stored and looked up by referencing a key. For example, a lookup may be performed based on a property name to locate a pointer to a memory location of the value. To facilitate a faster determination of the memory location, dynamically-typed languages dynamically generate object maps for computational objects at runtime to describe the memory layout of the objects. Additionally, in a dynamically-typed language, the type of a property value is often not known until runtime, and program code loaded during runtime may invalidate a prior assumption about the type of property value. This makes it difficult for a language implementation to use a "raw" storage format for double values.

SUMMARY

The subject technology provides a system and computer-implemented method for tracking property representations in instantiated objects. According to one aspect, a computer-implemented method may include providing a computational object that includes an object property having a first value of a first property type, setting the object property to a second value of a second property type, in response to setting the object property to the second value, generating a new object map for the computational object, the new object map mapping the object property to the second property type, and updating transition information in a base object map to designate the new object map instead of a first object map that maps the object property to the first property type. Other aspects include corresponding systems, apparatuses, and computer program products for implementation of the computer-implemented method.

In another aspect, a machine-readable medium may include instructions stored thereon that, when executed by a processor, cause a machine to perform a method of tracking property representations in instantiated objects. In this regard, the method may include providing a computational object that includes an object property having a first value of a first property type, setting the object property to a second value of a second property type, in response to setting the object property to the second value, generating a new object map for the computational object, the new object map associating a representation of the second property type with the object property, and updating transition information in a base object map to designate the new object map instead of a first object map that associates the object property with the first property type. Other aspects include corresponding systems, apparatuses, and computer program products for implementation of the machine-readable medium.

In a further aspect, a system may include one or more processors and a memory. The memory may include instructions that, when executed by the one or more processors, cause the one or more processors to facilitate the steps of providing an associated data structure that stores a first property value of a first property type as an object property, updating the object property with a second property value of a second property type, in response to updating the object property, generating a new object map for the associated data structure, the new object map mapping the object property to the second property type, updating transition information in a base object map to designate the new object map instead of a first object map that maps the object property to the first property type, and designating the first object map as invalid in connection with generating the new object map and updating the transition information.

The previously described aspects and other aspects may provide one or more advantages, including, but not limited to, providing type and mapping information about properties stored in computational objects so that a runtime environment does not need to dynamically check the type of the property value if the type has already been checked, for example, when loading values from properties. When a new property value (or property object) is stored in a property having a current property type that is incompatible with the new property value the current property type and mapping information for the computational object changes so that the information about the properties of the computational object is always guaranteed to be accurate.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
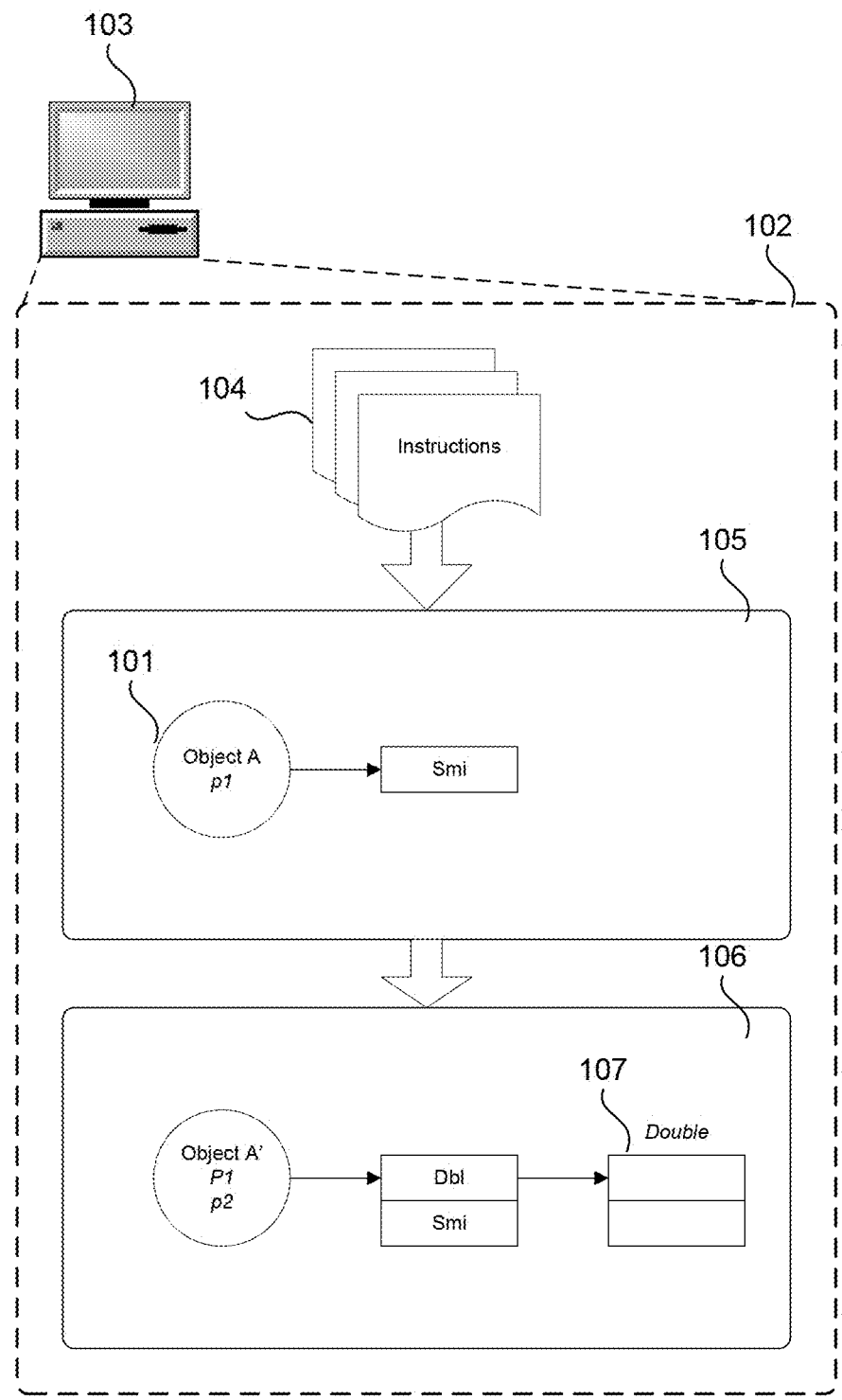
FIG. 1 depicts a modification of an example computational object in a dynamic runtime environment on a computing device.

FIG. 1 depicts a modification of an example computational object 101 in a dynamic runtime environment 102 on a computing device 103, according to one or more aspects of the subject technology. During operation of computing device 103, executable instructions 104 are loaded into runtime environment 102, compiled, and then executed. Instructions 104, when executed, create computational object 101 and may perform a number of operations upon computational object 101. Computational object 101 is a data structure such as an associative array that stores properties having set property values (e.g., a JavaScript dictionary object). Computational object 101 may not have a set number of properties and corresponding values but, rather, the number of properties may be changed by executable instructions 104 in response to predetermined execution paths, user input, or other influences on the runtime environment. For example, executable instructions 104 may be embedded in one or more web pages, and the number of properties and/or their corresponding property values may change in response to specific user-initiated navigation paths and/or input associated with the web pages.

Computational object 101 may store any type of property available to runtime environment 102, and the type of a value stored in a heap property may not be known until runtime. In this regard, computational object 101 may directly store small integers, but store pointers to other property values that must be allocated on the heap. For example, when storing a double value, a small object may be allocated on the heap to hold the value. As used herein, the technique of wrapping primitive values in objects is referred to as "boxing".

Double values are typically used more frequently than other types of values stored on the heap. Additionally, arithmetic operations on boxed double value require an extra memory indirection to access the "payload" (e.g., a 64-bit IEEE-754 payload) of a heap number object. When a new double value is created (e.g., as the result of an arithmetic operation), a new heap number object must be allocated to hold the result value. This allocation can be much slower than simply storing the 64-bit double value. Additionally, allocation of new heap number objects may place stress on the runtime environment's garbage collector, causing pauses in the execution of program instructions.

Accordingly, runtime environment 102 performs an initial check on all objects at the time executable instructions 104 are compiled. At this stage, type information for the objects is integrated into the compiled code. For each property stored in computational object 101 a property representation is also stored. The property representation may be, for example, either "small integer," "double," or "heap," or "tagged." When accessing a property, runtime environment 102 may quickly determine the property type for the property it is accessing and operate accordingly. If the property type is a "small integer" (or "smi") then the value may be directly read from computational object 101 without any additional programmatic overhead. If the value is a heap object and runtime circumstances have changed (e.g., new code has been injected into the environment) then runtime environment 102 must first access (e.g., dereference) the heap object to determine the property type and then dereference the value from the heap object.

A "double" value informs runtime environment 102 that the property value is a pointer to a double object owned by computational object 101. For example, on determining that a value is a "double," runtime environment 102 may quickly dereference the value from the double object. When writing a new double value, the new value may be written without having to re-allocate memory on the heap. Runtime environment 102 merely stores a new double value in the existing double object for the corresponding property of computational object 101. In one or more implementations, the double value is stored directly into a property of the object, without the need to generate a double object for the value. A tagged value informs runtime environment 102 that the property value includes a hidden bit within the value that designates the property value's type. A tagged value type can correspond to object pointers, small integers or heap numbers.

In the depicted example, a computational object 101 ("Object A") is dynamically modified to change an initial number of object properties provided by the object. Accordingly, in a first state 105, Object A has one property p1 having a small integer property type ("smi"). p1 may be stored and read by runtime environment 102 directly from the object. During operation of computing device 103, runtime environment 102 (in connection with executable instructions 104) adds a new property and changes the value and type of p1. In a second state 106, p1 is changed to a double" and a double object 107 is created to hold the value of p1. A second property p2 is added. p2 is stored as a small integer.

Figure 2:
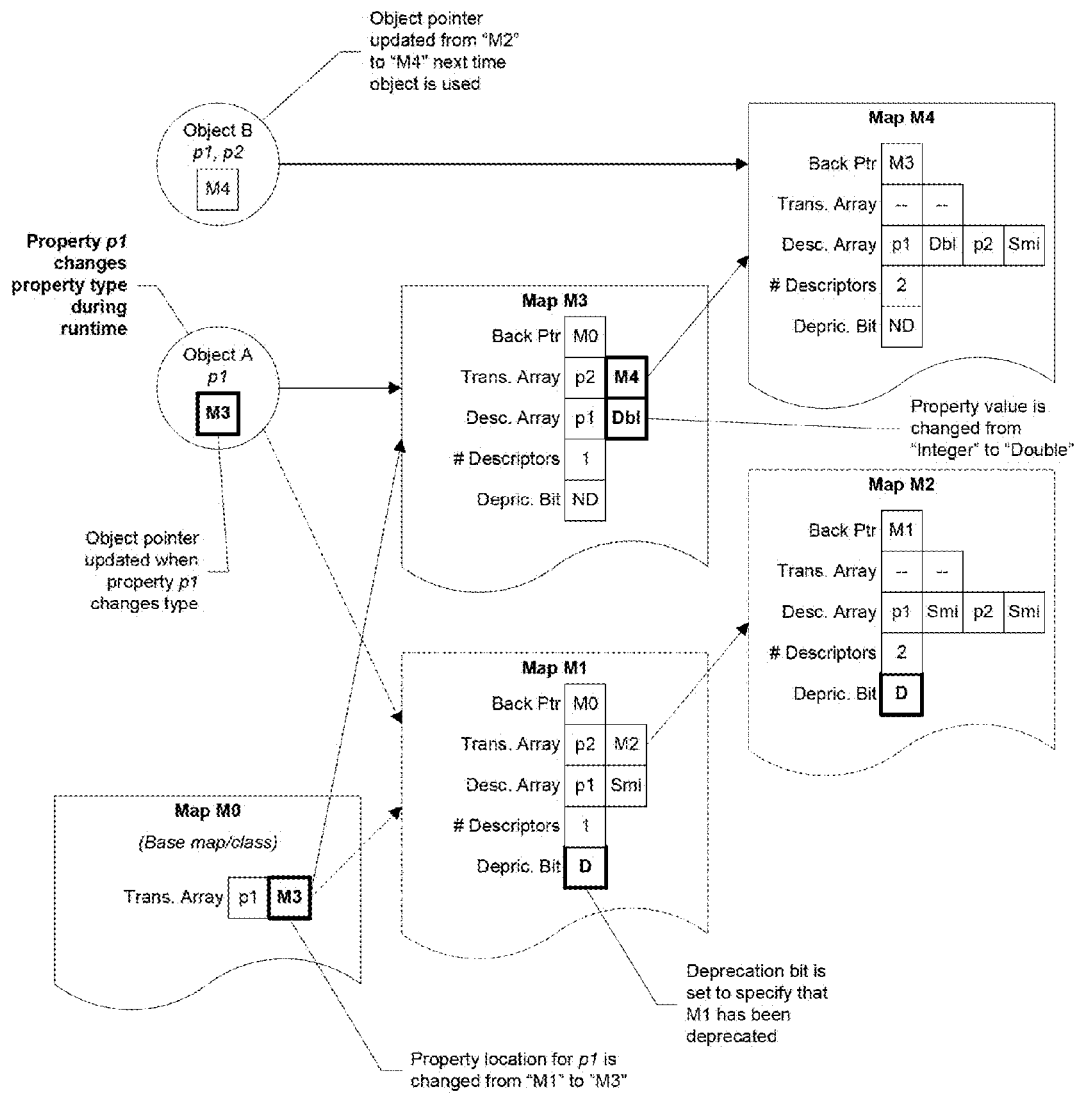
FIG. 2 is a diagram depicting the dynamic generation of an example object map for an example modified computational object.

FIG. 2 is a diagram depicting the dynamic generation of an example object map for an example modified computational object, according to one or more aspects of the subject technology. To facilitate a faster determination of the location in memory for a property value, each computation object of the subject technology has a corresponding object map (also called a "hidden class") that describes its layout. Object maps generally map property names to values (e.g., via memory offsets indicating where the value is stored for an instance of a corresponding object), and in this respect each object in the runtime environment includes an object map corresponding to the specific arrangement of the object. According to the subject technology object maps are dynamically generated or deprecated (e.g., designated or marked invalid) to suit the addition or subtraction of different property types at runtime. If a property is added to an object, a new map is generated for the object, and transition information is generated in the old map so that the new map and the memory location of the new property may be found when the property is being accessed.

Similarly, if a property value stored in an object has a different property type than what is represented by the current or target map for the corresponding property then a new map is generated for the object, and the current or target map is deprecated. In this regard, the new map includes a representation for the property that corresponds to the new property type.

Additionally, each map includes a deprecation bit that designates whether the map has been deprecated. This allows objects that have already been created (and have a pointer to an old map) to continue operating. When these older object are used (e.g., reinitialized) runtime environment 102 reads the deprecation bit to determine whether the corresponding map is still valid. In some aspects, if the map has been deprecated then the corresponding object may be rewritten to conform to the new map for the object. For example, if in the new version of the map the property value is a "double" and in the old version it is an "integer" then the object is rewritten so that the corresponding property includes a double instead of an integer. In some aspects, the runtime may not generate optimized code for deprecated classes, and/or optimized code for deprecated classes may be discarded or no longer used.

FIG. 2 is representative of how runtime environment 102 creates and deprecates object maps for Object A of FIG. 1 when the property values are updated and/or changed. In the depicted example of FIG. 2, Map M1 is initially created for Object A during the first state 105. M1, like other maps of the subject technology, includes parameters to facilitate determining the location of named properties and their corresponding property representations so that runtime environment 102 may efficiently operate on the object corresponding to the map. For example, M1 includes a descriptor array that determines what properties are stored in the object and, for each property, a corresponding property representation. M1's descriptor array informs runtime environment 102 that any object using map M1 has a single property p1 and that p1's representation is "Smi" (small integer). In some implementations, each descriptor array is sorted by the order that the properties were added, and each map stores the number of valid properties for the map.

M1 also includes a transition array. The transition array informs runtime environment 102 where to find properties not located in the current map. The transition array includes the property name in connection with a location of a target map for finding the location of the value of the property name. For example, if a new property p2 is added to Object A, the current map for the object M1 is updated with a transition to target map M2, indicating that if a property p2 is added to an object described by M1 then M2 should be used instead of M1. The transition array may include, for example, the name of the property in the target map (e.g., in M1) at a first position in the array, and a pointer to the target map at a second position in the array.

A transition array may include multiple property names, each associated with a different target map. In this respect, a map may branch to one or more other maps depending on how new properties were added at runtime. For example, an object having properties p1 and p2 may be in a different branch than an object having properties p1 and p3. In one or more implementations, if there is only one transition stored in the transition array then there is no need to store the property name of the transition; only the target map is stored.

FIG. 2 further depicts how one or more maps in a branch may be deprecated when a property type is changed during runtime. In the depicted example, property p1 of Object A is changed from a small integer to a double. In response, runtime environment 102 determines that the new type is not supported by M1's descriptor array. The runtime environment traverses to M1's base map M0 using a back pointer of M1, and uses M0 to create a new map M3 for Object A. M1 is subsequently deprecated by setting a deprecation bit in the map. As part of this process, the runtime environment may deprecate all maps in the same branch as a deprecated map. For example, M2 may have been created for Object B by adding a small integer property p2 to Object A. M2 may include transition information designating M3 as the location of p2, and M3 may include a back pointer to M2. Accordingly, M3 may be deprecated along with M1 when the property type of p1 is changed in Object A. The fields that have changed during the example deprecation process are shown in FIG. 2 as highlighted/bold.

Even though M3 has been deprecated some objects may still designate M3 as their map (e.g., hold a pointer to M3). For example, Object B may designate M2, however, M2 may be deprecated. Accordingly, the next time Object B is used, the runtime environment will identify M2 as a deprecated map and associate Object B with an updated map M4 that corresponds to the appropriate property types for p1 and p2. When runtime environment 102 detects that one or more property types of an object are different than what is represented by an updated map the runtime environment attempts to convert the corresponding property values to the same property type as represented in the updated map.

In the depicted example, p1 of Object B is currently a small integer (as represented in M2), and M4 represents p1 as a double value. When M2 is identified as being the updated map for Object B, runtime environment 102 converts the value stored in p1 to a double value. As will be explained with regard to FIG. 3B, if the property value cannot be converted (e.g., from double to small integer) then runtime environment 102 may perform a merge operation on the maps to generate a new map for the object, with property types suitable for the values currently stored in the object.

Figure 3A:
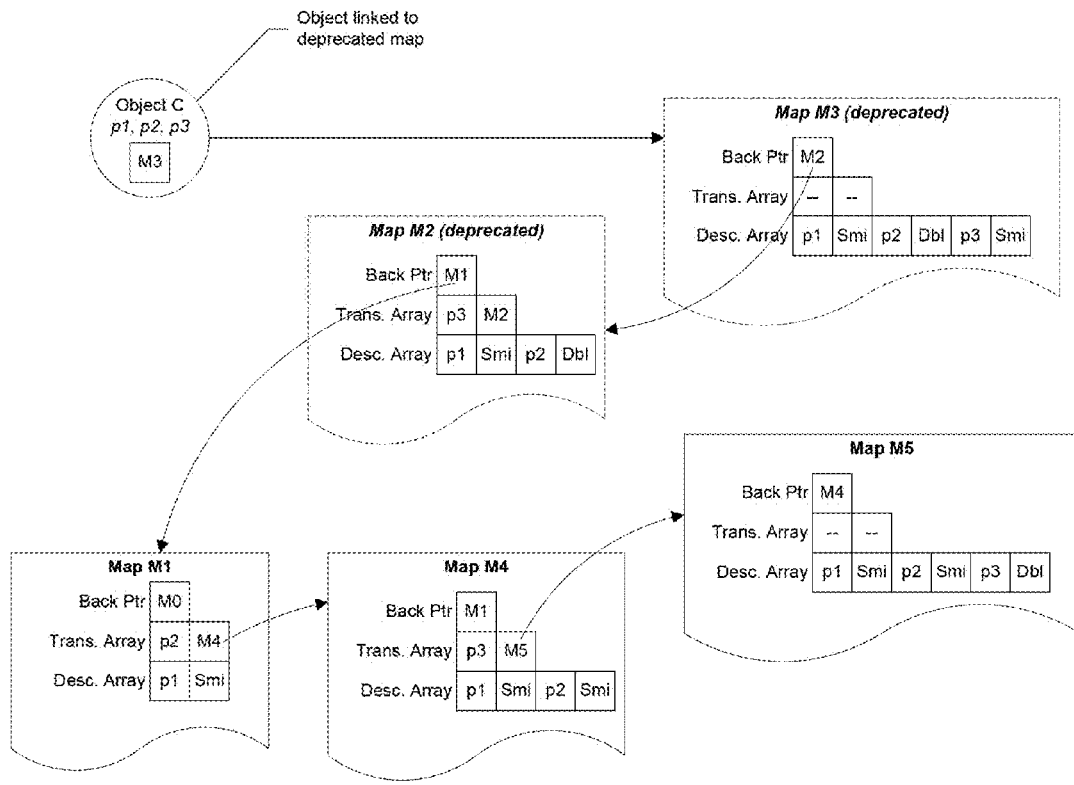
FIGS. 3A and 3B depict example processes for linking objects to updated object maps for the objects.
Figure 3B:
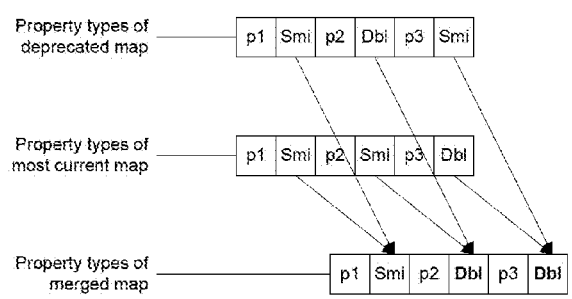

FIGS. 3A and 3B depict example processes for linking objects to updated object maps for the objects, according to one or more aspects of the subject technology. An object may be linked to updated object maps by first determining the most recently generated object map for the object, and then converting the property values within the object to correspond to the most recently generated object map, or if the properties cannot be converted generating a new map for the object.

FIG. 3A depicts an example process for determining the most recently generated object map for an example computational object. When a map is deprecated it is replaced by a new map having the correct property types in the transition tree. However, some objects may remain linked to the deprecated map. These objects may be linked to the new map the next time they are used, or in connection with deprecating the old map. The new map may be found by using the back pointer of each map in a chain of maps until a base map is reached, and then searching the transition array of the base map, and successive maps, to find a non-deprecated map that has all the same property names as the computational object. If any map in a chain still transitions to the deprecated map then its transition array may be updated with a new transition (e.g., pointer) to the new map (or a map in the non-deprecated branch leading to the new map), replacing the transition to the deprecated map.

In the depicted example, Object C is linked to deprecated map M3. When Object C is used for the first time since M3 was deprecated, the runtime environment uses M3's back pointer to trace backwards to a find a parent map M1 that has not been deprecated. M1's transition array is then used to determine whether there is a new map for Object C. Transition arrays are used in a forward direction to find an already created map, or to create a new map in the previously described manner. Runtime environment 102 navigates through the transition branches of M1 looking for properties that match the property signature of Object C. M5 matches the property signature of Object C: {p1, p2, p3}. Accordingly, Object C is linked to map M5. In other aspects, if M5 does not exist then it may be generated based on a transition to M4 and determining that the properties of M4 are partial match {p1, p2}.

Deprecated maps are never seen in the transition tree anymore. In this manner, only one specific map is created for each object configuration, maintaining a monomorphic programming environment. When no objects are using maps that have been deprecated, the deprecated maps will be garbage collected, saving memory in the runtime environment.

FIG. 3B depicts an example process for merging property representations, according to one or more aspects of the subject technology. When an object is linked to a recently updated map and the property values stored in the object cannot be easily converted to the property values represented in the recently updated map (e.g., without loss of data), the subject technology may create a new map to replace the updated map by merging the updated map with the deprecated map.

In this example, the new map must be able to correctly map property types (e.g., provide a memory mapping) for all properties stored in the object, and property values converted to property types corresponding to representations in the new map must be converted without loss of data. Accordingly, as depicted in FIG. 3B, property types for the recently updated map and the deprecated map (currently linked to the object) are evaluated by comparing the descriptor arrays of the two maps. The property types are then merged to create a new map (or descriptor array) that provides the most stable property types; a set of property types that can accommodate all property values currently stored in Object C, as well as have the best chance of accommodating other objects that have yet to be migrated. If the property types for the deprecated map are {(p1, Smi), (p2, Dbl), (p3, Smi)} and the property types for the most recently updated map are {(p1, Smi), (p2, Smi), (p3, Dbl)} then the property types may be merged to create a map having property types {(p1, Smi), (p2, Dbl), (p3, Dbl)}.

Figure 4:
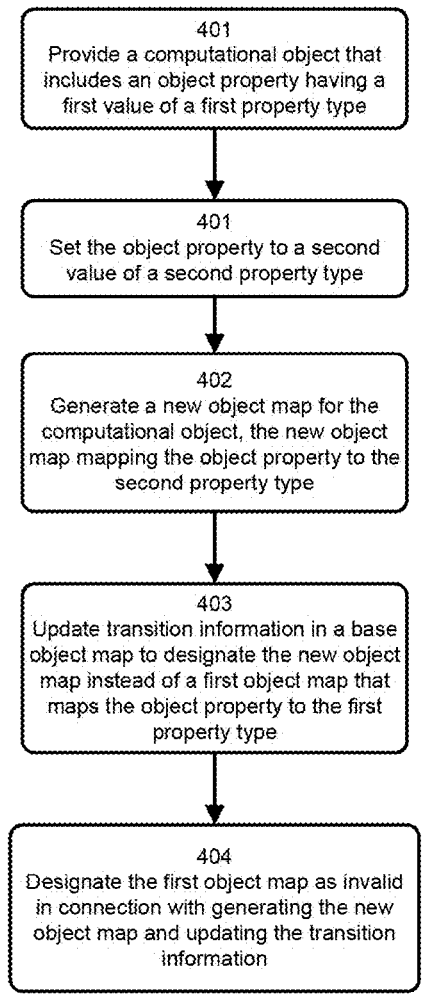
FIG. 4 is a flowchart for an example process of tracking property representations when an example computational object is modified.

FIG. 4 is a flowchart for an example process of tracking property representations when an example computational object is modified, according to one or more aspects of the subject technology. The blocks of FIG. 4 do not need to be performed in the order shown. It is understood that the depicted order is an illustration of one or more example approaches, and are not meant to be limited to the specific order or hierarchy presented. The blocks may be rearranged, and/or two or more of the blocks may be performed simultaneously.

According to one or more implementations, one or more blocks of FIG. 4 may be executed by a machine or computing device. Similarly, a non-transitory machine-readable medium may include machine-executable instructions thereon that, when executed by a machine or computing device perform the blocks of FIG. 4. Accordingly, the blocks of FIG. 4 may be performed in association with dynamically-typed languages, specifically in a dynamic programming environment in which a computational object is modified at runtime.

In block 401, a computational object is provided that includes an object property having a first value of a first property type. As described previously the computational object may be an associative array that stores properties as key-value pairs. The computational object is associated with a dynamically created map that maps properties stored in the computational object to locations (or offsets) in memory for corresponding values, and includes strong type information for those values. The type information may be stored in a descriptor array of the map for the object. In various aspects, the descriptor array may associate an identity (e.g., a name) of each property stored in an object associated with the map with a corresponding representation of the property's property type (e.g., "double" or "integer").

In block 402, setting the object property is set to a second value of a second property type. For example, the first value may be 1, a small integer, and the second value may be 1.1 a double value. When the runtime environment attempts to store the double value it will check the map to verify the type information, otherwise an error may be generated. In this example, the type information will be incorrect for the second value, indicating that the map does not correctly represent the object property.

In response to setting the object property to the second value, in block 403, a new object map is generated for the computational object, the new object map mapping the object property to the second property type. Accordingly, the new map may be dynamically associated with the computational object, and the descriptor array of the new map may associate the object property with a representation of the second property type. In one or more implementations, the descriptor array may be copied from another map previously associated with the computational object.

In block 404, transition information in a base object map is updated to designate the new object map instead of a first object map that maps the object property to the first property type. As described previously with respect to FIG. 2, maps are dynamically created in a tree formation, with each branch corresponding to objects having a different object property. Each map has transition information that allows the map to determine in what other map includes location and type information for a property. A property is located in a tree of maps by transitioning to each map and checking the map's property representations in the map's descriptor array. Maps are dynamically traversed using transition information in their transition arrays until the desired representation (e.g., the best match for the ordered collection of properties in the object) is identified. For example, if the computational object includes properties [a, b, c] then maps may be transitioned in the order: [ ]→[a], then →[a,b] and then [a,b,c]. It may not be necessary to first attempt to locate a representation for property c by the first transition [ ]→[c]. Only a map having a set of property representations with a matching offset in the order of the properties of the computational object may be considered to be an equal representation of the object.

Accordingly, when a new map is created this transition information is updated to replace a map that includes invalid or stale information with a new map that includes recent information for the new arrangement of object properties.

In block 405, the first object map is designated as invalid (e.g., deprecated) in connection with generating the new object map and updating the transition information. In one or more implementations, to maintain efficiency when using dynamically-typed languages, the subject technology maintains monomorphic behavior with respect to all objects in the runtime environment. This means that each object may only be associated with one map. Accordingly, when a new map is generated the current map must be deprecated and marked for garbage collection. By deprecating and garbage collecting unused maps, memory space is freed and the dynamically-typed language is processed more efficiently in the runtime environment.

Figure 5:
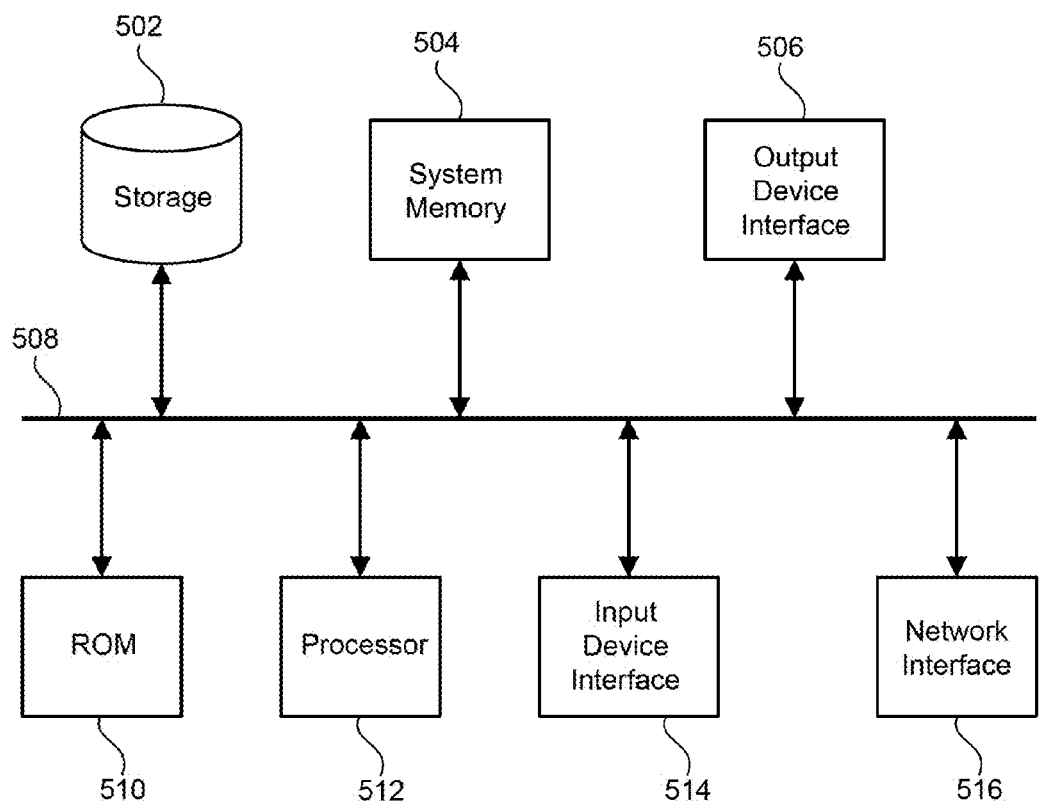
FIG. 5 is a diagram illustrating an example electronic system for use in connection with tracking property representations when an example computational object is modified.

FIG. 5 is a diagram illustrating an example electronic system for use in connection with tracking property representations when an example computational object is modified, according to one or more aspects of the subject technology. Electronic system 500 may be a computing device for execution of software that performs or implements the blocks of FIG. 4. In various implementations, electronic system 500 may be representative of a server, computer, phone, PDA, laptop, tablet computer, touch screen or television with one or more processors embedded therein or coupled thereto, or any other sort of electronic device.

Electronic system 500 may include various types of computer readable media and interfaces for various other types of computer readable media. In the depicted example, electronic system 500 includes a bus 508, processing unit(s) 512, a system memory 504, a read-only memory (ROM) 510, a permanent storage device 502, an input device interface 514, an output device interface 506, and a network interface 516. In some implementations, electronic system 500 may include or be integrated with other computing devices or circuitry for operation of the various components and processes previously described.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for tracking property representations when an object is modified, comprising:
   providing a computational object that includes an object property having a first value of a first property type;
   setting the object property to a second value of a second property type;
   in response to setting the object property to the second value, generating a new object map for the computational object, the new object map mapping the object property to the second property type, a representation of the second property type being provided in the new object map; and
   updating transition information in a base object map to designate the new object map instead of a first object map that maps the object property to the first property type, the updated transition information providing the representation of the second property type and an association between the representation of the second property type and a location of the new object map,
   wherein updating the transition information includes changing a map pointer from a location of the first object map to the location of the new object map, and
   wherein the base object map and the new object map comprise a transition array, the transition array of the base object map comprising one or more transition pairs, one of the transition pairs comprising an identification for the object property and the map pointer.

2. The computer-implemented method of claim 1, further comprising:
   designating the first object map as invalid in connection with generating the new object map and updating the transition information.

3. The computer-implemented method of claim 2, further comprising:
- determining, after the first object map is designated as invalid, that a second object is linked to the first object map;
- locating the new object map based on information in the first object map; and
- linking the second object to the new object map.

4. The computer-implemented method of claim 3, further comprising:
- determining that a property value stored in the second object is of the first property type; and
- converting the property value stored in the second object to the second property type.

5. The computer-implemented method of claim 2, further comprising:
- determining, after the first object map is designated as invalid, that a second object is linked to the first object map;
- determining that one or more mapped property types of the first object map are different than one or more respective mapped property types of the new object map;
- generating an updated object map that comprises a mapped property type for each property mapped by the first and new object maps, each mapped property type selected from the first or new object map based on a predetermined algorithm; and
- linking the second object to the updated object map.

6. The computer-implemented method of claim 5, wherein the predetermined algorithm comprises: selecting the mapped property type that is compatible with the most property values.

7. The computer-implemented method of claim 2, further comprising:
- locating, in connection with designating the first object map invalid, one or more child object maps of the first object map based on transition information in the first object map, each child map mapping the object property to the first property type and comprising at least one additional mapped property type; and
- designating each located child object map as invalid.

8. The computer-implemented method of claim 7, further comprising:
- creating a new child object map for each invalid child object map;
- determining one or more stale objects linked to the one or more invalid child object maps; and
- linking each stale object to a respective new object map.

9. A non-transitory machine-readable medium having instructions stored thereon that, when executed, cause a machine to perform a method, the method comprising:
- providing a computational object that includes an object property having a first value of a first property type;
- setting the object property to a second value of a second property type;
- in response to setting the object property to the second value, generating a new object map for the computational object, the new object map providing a representation of the second property type and associating the representation of the second property type with the object property;
- updating transition information in a base object map to designate the new object map instead of a first object map that associates the object property with the first property type, the updated transition information providing the representation of the second property type and an association between the representation of the second property type and a location of the new object map,
- wherein updating the transition information includes changing a map pointer from a location of the first object map to the location of the new object map, and
- wherein the base object map and the new object map comprise a transition array, the transition array of the base object map comprising one or more transition pairs, one of the transition pairs comprising an identification for the object property and the map pointer.

10. The non-transitory machine-readable medium of claim 9, the method further comprising:
- designating the first object map as invalid in connection with generating the new object map and updating the transition information.

11. The non-transitory machine-readable medium of claim 10, the method further comprising:
- determining, after the first object map is designated as invalid, that a second object is linked to the first object map;
- locating the new object map based on information in the first object map; and
- linking the second object to the new object map.

12. The non-transitory machine-readable medium of claim 11, the method further comprising:
- determining that a property value stored in the second object is of the first property type; and
- converting the property value stored in the second object to the second property type based on the representation of the second property type.

13. The non-transitory machine-readable medium of claim 10, the method further comprising:
- determining, after the first object map is designated as invalid, that a second object is linked to the first object map;
- determining that one or more property type representations in the first object map are different than one or more respective property type representations in the new object map;
- generating an updated object map that comprises a property type representation for each property associated with the first and new object maps, each property type representation selected from the first or new object map based on a predetermined algorithm; and
- linking the second object to the updated object map.

14. The non-transitory machine-readable medium of claim 13, wherein the predetermined algorithm comprises: selecting the property type representation that is compatible with the most property values.

15. A system, comprising:
one or more processors; and
a memory including instructions that, when executed by the one or more processors, cause the one or more processors to facilitate the steps of:
- providing an associated data structure that stores a first property value of a first property type as an object property;
- updating the object property with a second property value of a second property type;
- in response to updating the object property, generating a new object map for the associated data structure, the new object map mapping the object property to the second property type, a representation of the second property type being provided in the new object map;
- updating transition information in a base object map to designate the new object map instead of a first object map that maps the object property to the first property type, the updated transition information providing the representation of the second property type and an association between the representation of the second property type and a location of the new object map, wherein updating the transition information includes changing a map pointer from a location of the first object map to the location of the new object map, and wherein the base object map and the new object map comprise a transition array, the transition array of the base object map comprising one or more transition pairs, one of the transition pairs comprising an identification for the object property and the map pointer.

16. The system of claim 15, wherein the instructions, when executed, further cause the one or more processors to facilitate the steps of:

designating the first object map as invalid in connection with generating the new object map and updating the transition information.

17. The system of claim 16, wherein the instructions, when executed, further cause the one or more processors to facilitate the steps of:

determining, after the first object map is designated as invalid, that a second associative data structure is linked to the first object map;

locating the new object map based on information in the first object map; and linking the second associative data structure to the new object map.

* * * * *